United States Patent [19]

Schweizer

[11] 4,191,292
[45] Mar. 4, 1980

[54] CONTAINER FOR INTERCHANGEABLE TAPE CASSETTE

[76] Inventor: Eduard H. Schweizer, Heubachstrasse 41, 8810 Horgen, Switzerland

[21] Appl. No.: 918,264

[22] Filed: Jun. 22, 1978

Related U.S. Application Data

[63] Continuation-in-part of Ser. No. 839,890, Oct. 6, 1977, abandoned.

[30] Foreign Application Priority Data

Mar. 21, 1977 [CH] Switzerland .......................... 3476/77

[51] Int. Cl.² ........................................... B65D 85/672
[52] U.S. Cl. ..................................... 206/387; 312/319; 312/345
[58] Field of Search ............ 206/387, 444, 817, 45.15, 206/44.12, 45.16; 229/9, 11, 19, 20; 221/226, 229, 255, 279, 280; 312/319, 345

[56] References Cited

U.S. PATENT DOCUMENTS

| 3,620,361 | 11/1971 | Fugiwara et al. | 206/387 |
| 3,642,337 | 2/1972 | Manheim | 206/425 X |
| 3,836,222 | 9/1974 | Kuntze | 206/387 X |
| 3,899,229 | 8/1975 | Ackeret | 206/387 X |
| 3,926,310 | 12/1975 | Ackeret | 206/387 |
| 4,024,954 | 5/1977 | Staar | 206/387 |
| 4,030,601 | 6/1977 | Ackeret | 206/387 |
| 4,046,255 | 9/1977 | Ackeret | 206/387 |

Primary Examiner—Joseph Man-Fu Moy
Attorney, Agent, or Firm—Cushman, Darby & Cushman

[57] ABSTRACT

A container for an interchangeable cassette comprises a casing having a frame-like slide therein which engages the cassette. For removal of the cassette from the casing, a spring urges the slide and cassette outwardly and the arrangement is such, that in the open position of the slide, at least that part of the slide which protrudes from the casing assumes an oblique position relative to the casing and cassette to allow the cassette to be removed directly from the casing. The slide may include tape hub-engaging bosses to prevent tape spillage.

21 Claims, 10 Drawing Figures

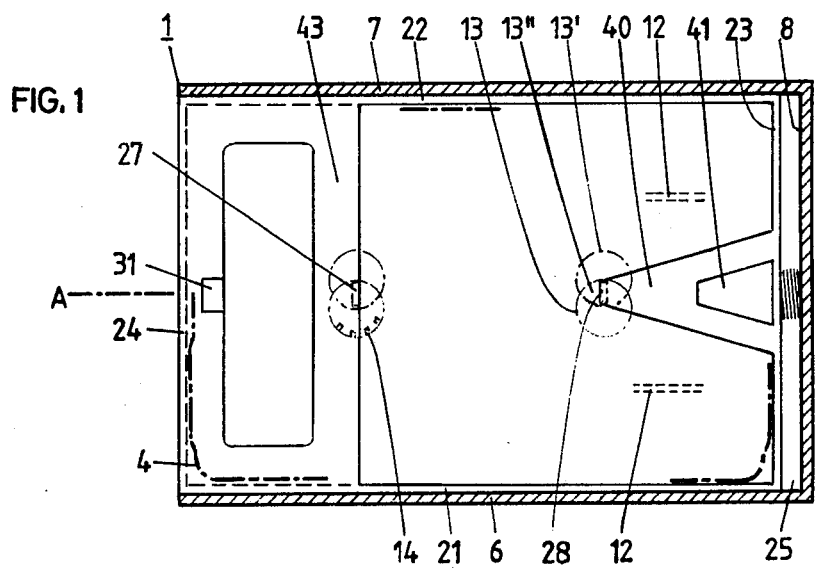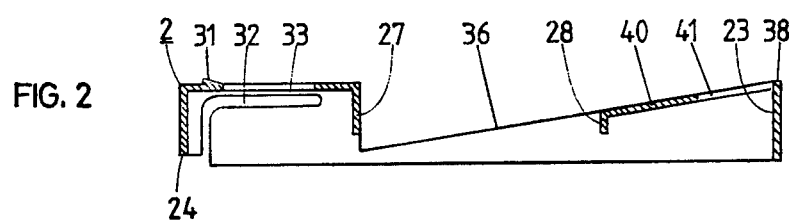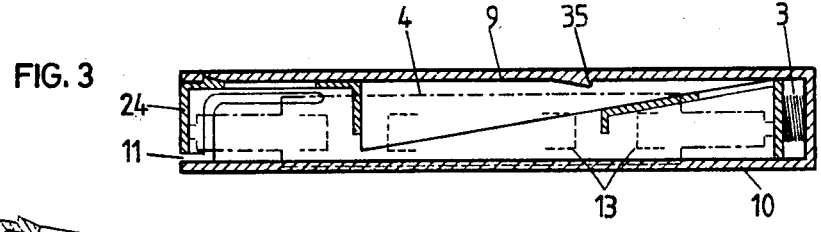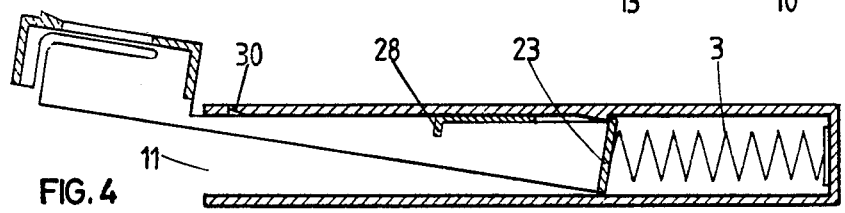

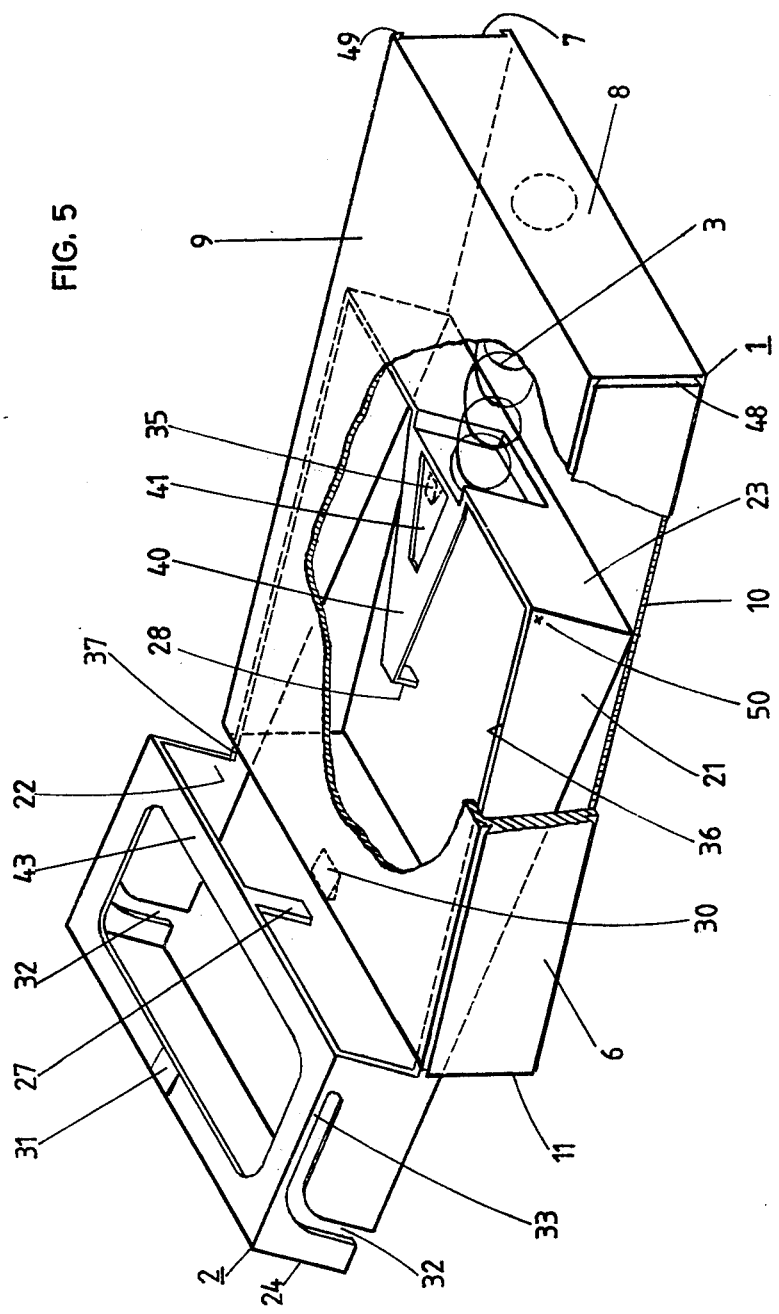

CONTAINER FOR INTERCHANGEABLE TAPE CASSETTE

This application is a continuation-in-part of my copending application Ser. No. 839,890, filed Oct. 6, 1977, now abandoned.

The invention relates to a container for a magnetic tape cassette located therein.

Such containers are known which comprise a rectangular casing, a push-in slide which is movable along a narrow side of the casing and which receives the tape cassette, and a compression spring which engages between the rear wall of the push-in slide and the rear side of the casing. After unlocking a holding device, the compression spring propels the push-in slide together with the tape cassette by a certain distance out of the casing into an open position in which the tape cassette can be removed from the container without hindrance. Tape cassette containers of this type for music tape cassettes have the advantage that they allow a quicker and simpler removal of the cassette, as compared with containers which have a hinged cover hood and which are commercially available as standard boxes (as in the PHILIPS system) or are designed, for example, in accordance with U.S. Pat. No. 3,532,211 (GELLERT). Thus, for example, the cassette cannot be removed from these known boxes using one hand. Furthermore, these hinged boxes exclude the possibility of assembling several boxes into a stable stack, since indeed it would be necessary to dismantle the stack each time in order to be able to open a desired box. For ordered storage and stowing, however, stacking is frequently desirable.

Therefore, containers have been proposed in the past, which consist of a casing which has a drawer, which can be longitudinally moved therein, for receiving the tape cassette, for example in U.S. Pat. Nos. 3,642,337 (MANHEIM), 3,836,222 (KUNTZE), 3,899,229 (ACKERET) and 4,046,255 (ACKERET). Since, however, the drawer itself requires space in the casing, all these containers with drawers have the disadvantage that the external dimensions of their casings exceed the standardised dimensions of the hinged standard casings mentioned in at least one edge direction. Since, however, tape cassettes with recorded music have hitherto been sold in large numbers above all in standard casings of this type, the displays in the shops are accordingly fitted out for the dimensions thereof so that the known push-in containers do not fit these racks, and this represents a considerable disadvantage.

Another disadvantage of the known containers having a drawer-like push-in slide is that, due to its unsymmetrical shape, the tape cassette can always be stowed in the container in one defined and prescribed orientation only. For example, in the container described in U.S. Pat. No. 3,899,229, the tape cassette must first be placed in the transverse format into the projecting slide-like drawer in such a way that its thicker part points towards the opening of the casing, before the drawer can be pushed into the casing. This deposition of the tape cassette into the drawer proves to be involved since the user is forced to turn the cassette in the hand until it has the correct orientation.

A further construction of known holders for tape cassettes has individual compartments and makes it possible to store many tape cassettes in a confined space and to remove them with only one hand, as described, for example, in U.S. Pat. No. 3,677,396 (STAAR) as well as Nos. 3,994,550, 3,994,551, 3,995,737, 3,995,921 and 4,030,601 (all by ACKERET). These constructions of holders have, however, an open front; thus, the tape cassettes are not protected against dust in storage.

Finally, there has been a proposal for a container in U.S. Pat. No. 3,904,259 (HOFFMANN), in which one narrow side of the container is designed as a cover. In this container, it would indeed be possible to adhere to the standardised dimensions, and it is likewise possible to remove the cassette with one hand. It is, however, disadvantageous that, on the one hand, the cassette is completely ejected out of the casing under the pressure of a spring after the cover has been opened and, on the other hand, it is not possible, in the closed position, to lock the reel cores of the cassette located in the casing.

According to the present invention there is provided a container for an interchangeable tape cassette comprising:

a rectangular casing having flat top wall, bottom, two parallel narrow side walls, rear wall and a front opening;

a cassette-moving push-in slide in the form of a four-sided frame, fitting and movable inwardly and outwardly within said casing through said opening between closed and open positions, the two side parts of the frame extend along the narrow side walls of the casing and which frame leaves the bottom of the casing free and at least partially surrounds periphery of the tape cassette lying on the bottom;

spring means engaged between siad casing and said frame and which, after unlocking a holding device, propel the frame with the tape cassette by a certain distance through said front opening into said open position;

guide means for controlling the movement of the frame which are designed in such a way that, in the open position, at least that part of the frame which protrudes from the casing takes up an oblique position relative to the bottom of the casing, the tape cassette which lies on the bottom of the casing and protrudes from the casing, being at least partially released.

Embodiments of the present invention can have outer dimensions which meet the standardised norm specifications. In addition, the casing can be arranged to allow the tape cassette to be stowed in four different orientations. In the preferred embodiment, the tape cassette is enclosed on all sides within the casing so that it is protected from dust, each reel hub is locked against spontaneous turning, and removal or stowing of the tape cassette can be carried out with one hand. During stowing, the disadvantageous step of placing the tape cassette onto a projecting part of the push-in slide can be eliminated. On the other hand, when the cassette is removed, after release of the holding device, the cassette protrudes from the casing, without dropping out, by an amount such that it automatically slides into the hand when gripped. Finally, both flat sides of the container can be labelled and the container can be manufactured as a cheap mass-produced article.

The invention will be further described with reference to the accompanying drawings in which:

FIG. 1 is, in a simplified diagrammatic representation, a plan view onto the frame of a first embodiment of a cassette container for a tape cassette, the casing being shown in section;

FIG. 2 is, in a simplified diagrammatic representation, a section through the frame of FIG. 1 along the line A—A of FIG. 1;

FIG. 3 is, in a simplified diagrammatic representation, a section through the container according to FIG. 1, in the closed position, along the line A—A of FIG. 1;

FIG. 4 is the same section as in FIG. 3, but in the open position of the container; and FIG. 5 is a simplified perspective view, partly broken away, of an illustrative embodiment of container which conforms for the most part with the embodiment of FIGS. 1 to 4, in the open position.

Figure 6:
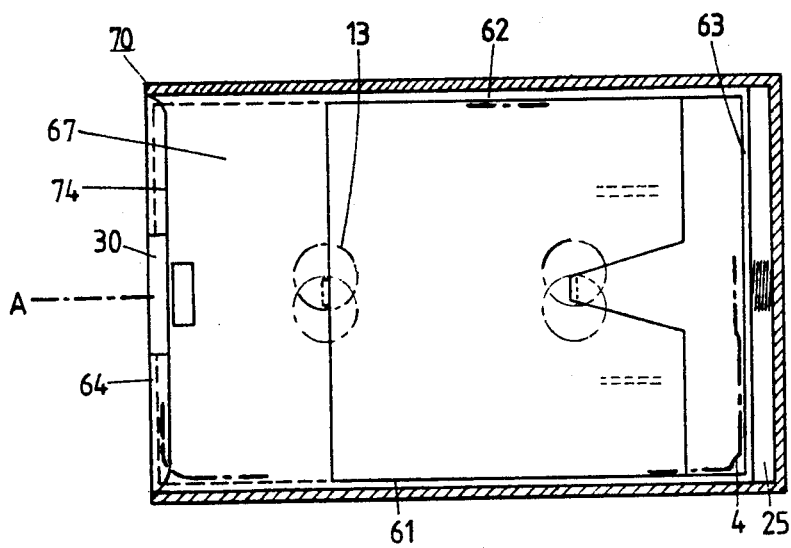
FIG. 6 is the same view as in FIG. 1 of another embodiment of a cassette container.
Figure 7:
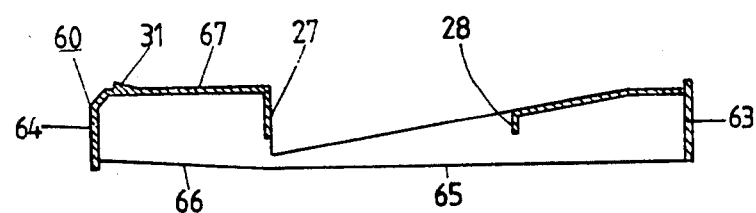
FIG. 7 is the same view as in FIG. 2 of the embodiment of FIG. 6.

The tape cassette containers to receive music tape cassettes shown in FIGS. 1 to 5 comprise essentially three parts: a casing 1; a push-in slide 2; and a compression spring 3. The outlines of a standardised magnetic tape cassette 4 of the type on the market are also indicated in FIGS. 1 and 3 in dots and dashes. All the components of the container, except the spring 3, preferably consist of a thermoplastic material, for example polystyrene.

The rectangular flat casing 1 of the container has external dimensions, for example, of $1.7 \times 7 \times 10.9$ cm and thus the same size as standard containers on the market. Accordingly, the container can be displayed or stowed in all existing racks and can be labelled on all sides. The casing 1 consists of a pair of relatively long narrow sides 6 and 7, rear wall 8, flat top wall 9 and a lower flat side which is designated as the bottom 10 of the casing in the following text. The designation as the bottom of the casing and the orientation of the casing in FIGS. 1 to 5 are intended to be illustrative only and is not to be taken as meaning that the container will not work in other orientations. The container can for example be used in a similar manner when standing on the rear wall 8 or held vertically in the hand. Alternatively, a container stack assembled by means of the flat sides 9 and 10 can take up any desired spatial orientation; this applies likewise to the individual container held in the hand. The end face of the casing 1 which is opposite the rear wall 8 is open and forms the entrance 11 for the push-in slide 2.

The successful operation of the device is essentially based on the special design of the push-in slide 2 and on the guiding thereof in the casing 1. This push-in slide 2 is designed as a four-part frame and has two parallel side parts 21 and 22, a rear side 23 and a front wall 24, which together form the rectangular frame. With respect to its dimensions, the frame 2 matches the outline of the cassette, so that the narrow sides of the cassette rest against the four frame sides, as FIG. 1 makes clear. In the pushed-in position of the frame 2, designated in the following text as the closed position, the side parts 21 and 22 of the frame rest against the narrow sides 6 and 7 of the casing. The rear wall 8 of the casing and the rear side 23 of the frame are opposite one another, in parallel and provide a space 25 in which the compression spring 3 is located. Moreover, in the closed position, the front wall 24 of the frame forms the closure of the entrance 11 of the casing. An advantage of the frame 2, as compared with conventional drawer-like push-in slides, is its small space requirement in the casing 1. The tape cassette 4 rests on the bottom 10 of the casing or on longitudinal ribs 12 thereof, the position of which is merely indicated in FIG. 1 and which support the flat part of the cassette 4. The frame 2 thus does not exert any supporting action on the tape cassette 4 since it leaves the base 10 of the casing free.

The container in the present illustrative embodiment is designed for the reception or removal of the cassette 4 in an elongate format in any of its four possible orientations. FIGS. 1 and 3 show the closed position of the container in which the cassette 4 is stored so that it is protected from dust, shake-proof and locked against turning of its reel hubs. FIGS. 4 and 5 illustrate the open position of the container in which the front part of the frame projects from the entrance 11 of the casing and takes up an oblique position relative to the bottom 10 of the casing. The frame is urged into the open position under the pressure of the spring 3 and this is initiated by unlocking a releasable holding device on the front wall 24 of the frame and which responds to finger pressure.

This holding device comprises a notch 30 in the top wall 9 and which forms a stop for a tooth 31 which engages therein and is located on the frame 2 above the front wall 24 of the frame. The notch 30 and the tooth 31 form the holding device and can be unlocked in order to open the container. For this purpose, the front part of the frame 2, carrying the front wall 24 and the tooth 31, is partially separated from the remainder of the frame by the slots 32 in the side parts 21 and 22. The front part which is isolated in this way, is thus suspended on the narrow strips 33 which are elastically deformable. Accordingly, when pressed by a finger on the front wall 24, the tooth 31 reacts with a downward movement until the holding device is completely unlocked.

The frame 2 possesses two lugs 27 and 28 which are arranged one behind the other longitudinally of the frame and which, as shown in FIGS. 1 to 3, reach from above into the reel hubs 13 of the cassette 4 and are fastened on the frame 2 in a manner which is further described below. The tape cassettes 4 of the type which can be used have reel hubs 13 which are arranged asymetrically to the central axis of the cassette, and this has restricted push-in slides hitherto known to storage in only two orientations of the cassette. In the present case, however, the lugs 27 and 28 are positioned and dimensioned so that they make all the four orientations of the cassette in the frame 2 possible. The flat lugs 27 and 28 lie on the longitudinal axis of the frame 2 and thus also on the longitudinal axis of the cassette and are mirrorsymmetric with respect to the latter. However, when a cassette is turned by 180° about its longitudinal axis, the two hole positions 13 and 13' each overlap by a common zone 13" as FIG. 1 shows. For this reason, the lugs 27 and 28 are positioned and dimensioned in such a way that they protrude into the capstan holes 13 only in the overlapping zone 13" and, without exceeding the latter, are in engagement with the toothed rim 14 of the tape reel hubs. The lugs 27 and 28 effect the desired locking in the overlapping zone 13" because of the position of the cassette 4 between the sides 21 to 24 of the frame.

As FIG. 4 makes clear, the frame 2, when in its open position, takes up an oblique position with respect to the bottom 10 of the tape casing, the entrance 11 of the casing being unblocked on all sides. The part of the frame remaining in the interior of the casing when in the open position should have a greater length than the protruding part of the frame, i.e. the front part in the following text, in order to prevent the cassette 4 dropping out of the casing 1. During its advance to the open position, the frame 2 is guided in such a way that it first carries out a longitudinal movement and, subsequent thereto, a tilting movement into the oblique position mentioned. The longitudinal movement pushes the cassette 4 out of the casing 1 by a desired distance, whilst the tilting movement both unblocks the entrance 11 of the casing and the front part of the cassette 4 and removes the lugs 27 and 28 from the reel hubs 13.

In the open position, the frame 2 is pushed forward as far as is permitted by the distance of the rear side 23 of the frame in the closed position from a casing stop 35 located in front thereof. This casing stop 35 protrudes like a tooth from the top wall 9 of the casing into the interior of the casing and is located immediately in front of and above the rear lug 28. The distance of advance of the frame is thus slightly greater than the distance from the rear side 23 of the frame to the rear lug 28. Since this distance also corresponds to the spacing between the front wall 24 of the frame and the front lug 27, the frame 2 is pushed forward only until the front lug 27 emerges from the entrance 11 of the casing. The essential point is that on the bottom 10 of the casing there is no stop corresponding to the casing stop 35. Therefore, under the force of the spring, a torque is exerted on the rear side 23 of the frame when its upper edge 38 is in contact with the stop 35. Thus, the casing stop 35 forms a hinge for the frame 2.

However, the torque acting on this hinge swivels the frame 2 into the described oblique position only after the advance has ended, that is to say after the front lug 27 has emerged from the entrance 11 of the casing. The part of the frame which remains in the casing when in the open position, must be suitably designed so that it is capable of swivelling. In the present case, this is accomplished by chamfered sections 36 and 37 of the upper edges of the side parts 21 and 22 of the frame. The chamfered edge sections 36 and 37 start at the level of the front lug 27 and extend in a rising straight line up to the upper edge 38 of the rear side 23 of the frame. In the open position, the edge sections 36 and 37 are in contact with the top wall 9 of the casing, that is to say their angle of inclination corresponds to the swivelling angle of the frame 2. This swivelling angle is of such a magnitude that the rear lug 28 in the interior of the casing unblocks the capstan hole 13, when in the open position. For this purpose, the rear lug 28 is mounted on a triangular bracket 40 which extends downwards from the upper edge 38 of the rear side 23 of the frame at the same angle of inclination as the edge sections 36 and 37. In the closed position, the bracket 40 presses resiliently onto the cassette 4 and, advantageously, effects shakeproof contact of the cassette 4 with the bottom 10 of the casing. The bracket 40 is also provided with a recess 41 which is located in front of the rear side 23 of the frame and through which the casing stop 35 protrudes during the advance. The front lug 27 is mounted on a tie 43 extending transversely between the upper edges of the frame 2.

The frame 2, which carries out the swivelling movement described above, and the provisions required to enable the rear lug 28 to disengage from the capstan hole 13 virtually do not require any extra space in the casing 1 so that it is possible to adhere to the standard dimensions mentioned of the container. It should also be pointed out that the cassette 4 is not ejected from the casing 1 by, for example, inertia. The frame 2, and with it the cassette 4 come to a standstill as soon as the longitudinal advance is followed by the tilting movement and in particular even before the frame 2 swivels into its oblique position and laterally frees the tape cassette 4. The user is, however, at liberty to hold the container, with the entrance 11 of the casing pointing obliquely downwards, in such a way that the cassette 4 automatically slides into the open hand. Such removal with one hand is frequently desirable, for example in motor vehicles. The frame construction, which clears the entrance 11 of the casing, also permits particularly simple stowing of the cassette 4. It is merely necessary to insert the cassette 4 in any desired longitudinal orientation into the casing 1 and subsequently to tilt the frame like a cover over the projecting end of the cassette and to push the frame in. During both removal and stowing, lifting-off or placing-down, respectively, of the cassette, which is necessary with conventional push-in containers, from or onto the base plate of the push-in slide is thus eliminated.

A further advantage is that all the six container walls are plane on the outside and are suitable for the application of labelling so that inscribed container packages are superfluous.

Figure 8:
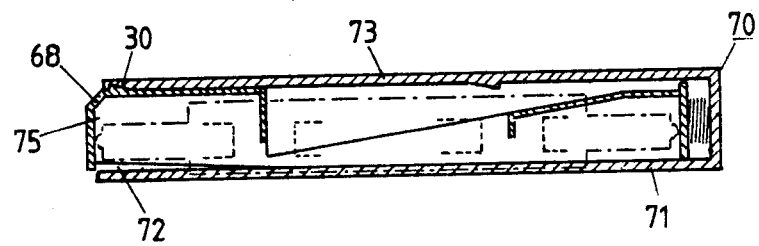
FIG. 8 is the same view as in FIG. 3 of the embodiment of FIG. 6.
Figure 9:
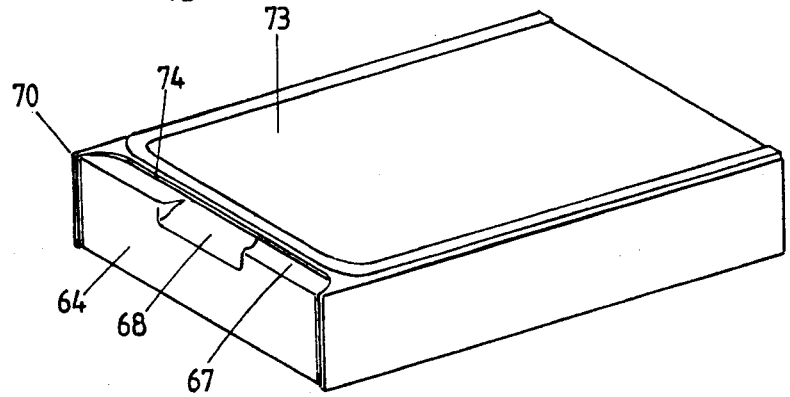
FIG. 9 is a simplified perspective view of the container of FIG. 6, in the closed position.

The above container is also suitable for releasably fastening several like containers to one another, either side-by-side along the narrow sides 6 and 7 or stacked above one another along the flat sides 9 and 10. Examples of possible connecting means are groove connections which are provided on the sides 6, 7, 9 and 10 of the container. In FIG. 5, such groove-like complementary dove-tail connections 48 and 49 are indicated on the narrow sides 6 and 7. When several containers of this type are connected together along their narrow sides, their top flat sides 9 form a plane surface on which a common picture with text can be mounted to indicate a work of music which requires several cassettes. Grooves which correspond to the groove connections 48 and 49 and are not shown here, can also be provided on the flat sides 9 and 10 so that several containers can be pushed together to form a stack in which all the inlets 11 of the containers are arranged one above the other. Since container stacks are known in themselves, a detailed explanation or a graphic representation are superfluous. It can be seen at once that, in a stack built up from the containers described above, each individual container is accessible for stowing a cassette or removing a cassette, and the cassette can also be removed unhindered from the lowest container. The embodiment of the tape cassette container shown in FIGS. 6–10 conforms for the most part with the embodiment of FIGS. 1 to 5. The four-sided rectangular frame 60 has two parallel side parts 61, 62, a rear side 63 and a front wall 64. The lower edges of the side parts 61, 62 consist each of a rear section 65 and a front section 66. In the closed position, the frame 60 rests with its rear edge sections 65 on the bottom 71 of the casing 70. The front edge sections 66 are chamfered and extend in a rising straight line to the front wall 64, thus forming a tapered slot 72 with the bottom 71. Above the front edge sections 66 is the frame 60 covered by a flat web 67 extending between the upper edges of the side parts 61, 62 and of the front wall 64. In the closed position of the frame 60, the web 67 rests against the flat top wall 73 of the casing 70 which ensures a shake-proof storage of the frame 60 in the casing 70. The front end of the top wall 73 of the casing 70 is formed with a recess 74 extending between the both side walls of the casing 70. As can best be seen from FIG. 9, the recess 74 exposes the front portion of the web 67. The front portion of the web 67 and the front wall 64 of the frame 60 completely close the entrance 75 of the casing 70. FIG. 8 illustrates that the front wall 64 of the frame 60 projects from the front edge of the bottom 71 about the amount of the wall thickness.

Figure 10:
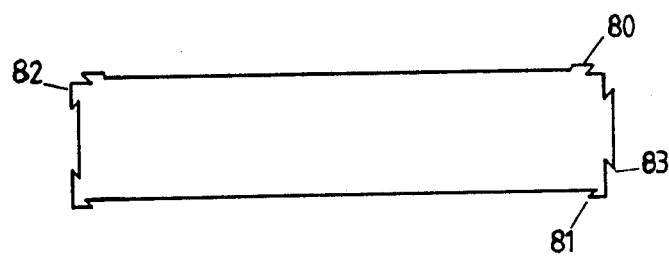
FIG. 10 is a cross section through the casing of the container of FIG. 6, showing only the contour of the casing.

The above design results in a particular convenient operation into the open position of the frame if one hand actuation is preferred. The holding device comprises again the tooth 31 projecting from the web 67 and engaging in the notch 30 in the top wall 73 of the casing 70. Unlocking in order to open the container is carried out by pressing down the front portion of the web 67 exposed by the recess 74. The tapered slot 72 is elastically narrowed during that opening operation. A sunk recess 68 is formed at the front end of the web 67, which makes the container accessible for opening operation also if a number of containers is stacked one above the other to form a stack in the above described manner. Finally FIG. 10 shows exemplary groove-like complementary dove-tail connections 80, 81 and 82, 83 on the surface of the casing 70 for forming stacks along the flat walls or along the narrow walls of the casing 70, respectively. It is pointed out, that all attributes of the invention described in connection with the embodiment of FIGS. 1 through 5 are also true for the embodiment of FIGS. 6 through 10 so that a description of parts and characteristics already known is disregarded from.

Various modifications of the above embodiments are possible. For example, the casing stop 35 can be replaced by a pin at each of the points 50 (FIG. 5) on the narrow side walls 6 and 7 of the casing. The holding device can comprise a pushbutton and can be located in the rear space of the casing instead of in the entrance of the casing. Any suitable design of spring can be used and it can be accommodated in any desired manner between the rear walls 8 and 23. With respect to general configuration, the container of the illustrative embodiments can also be modified in such a way that it is able to receive the tape cassette in all four broadside orientations. Although the container has been described with reference to music tape cassettes, it is likewise suitable for any type of tape cassettes, in particular if it is important to adhere to container sizes which are already standardised. Thus, the container of the illustrative embodiments can be modified in such a way that it is suitable for stowing and removing video tape cassettes, in which case the components for locking the reel hubs may then be unnecessary. With an appropriate adaption, if necessary, the container can be used for tape cassettes with digital information thereon.

I claim:

1. A container for a tape cassette comprising:
   a rectangular casing having flat top wall, bottom, two parallel narrow side walls, rear wall and a front opening;
   a cassette-moving push-in slide in the form of a four-sided open-bottom frame, fitting and movable inwardly and outwardly within said casing through said opening between closed and open positions, the two side parts of said frame extending along said narrow side walls of said casing and which frame at least partially surrounds the periphery of a tape cassette lying on said casing bottom;
   spring means engaged between said casing and said frame which, after a holding device is unlocked, will propel said frame together with a tape cassette, which will slide therewith along said casing bottom, a certain distance through said front opening into said open position;
   guide means for controlling the movement of said frame which are designed in such a way that, in said open position, at least that part of said frame which protrudes from said casing assumes an oblique position relative to said bottom of said casing so that a tape cassette which lies on said bottom of said casing and protrudes therefrom, is at least partially exposed.

2. The structure defined in claim 1 wherein: the frame has a front wall which closes the front opening of the casing; and frame is supported on the bottom of said casing by the lower edges of its side parts; the guide means during initial movement of said frame from closed to open position maintains said frame parallel to said bottom of said casing and subsequently allows movement into the oblique position; and a front part of said frame which protrudes from said casing in said open position has a smaller length than that part of said frame which remains within said casing.

3. The structure defined in claim 2 wherein a part of the frame is designed to be capable of a swivelling motion within the casing, and including at least one stop which is located on said casing, is in a zone above the locus of the force of the spring means, and is engageable by the rear wall of said frame when the latter is in the open position to move said frame into the oblique position.

4. The structure defined in claim 3 wherein the casing stop is located on the top flat wall of the casing and including chamfered sections on the upper edges of the side parts of the frame in the zone of that part of said frame which remains within the casing, which sections rest, when in the open position, against said top wall of said casing and define the angle of the oblique position of said frame versus the bottom of said casing.

5. The structure defined in claim 1 wherein the container is designed for stowing and removing a music tape cassette in all its four elongate orientations.

6. The structure defined in claim 5 wherein the frame is provided along its central axis with two lugs spaced apart a distance corresponding to the spacing between centres of the capstan holes of tape cassettes, which lugs extend perpendicular to the bottom of the casing when in the closed position and are so located and designed that they protrude and fit into that hole zone of the capstan holes which is overlapped by another hole when the position of a cassette is turned about the londitudinal axis of the cassette.

7. The structure defined in claim 6 wherein the rear lug, when in the closed position, is located between the casing stop and the rear wall of the frame and when in open position, is removed from the capstan hole zone.

8. The structure defined in claim 7 wherein, when in the closed position, the casing stop is located immediately in front of the rear lug, and said lug is mounted on a bracket which is fixed to the rear wall of the frame and rests resiliently on a cassette in the capstan hole zone.

9. The structure defined in claim 3 wherein: the lower edges of the frame side parts each consist of a rear section by which the frame rests on the casing bottom in the closed position, and a chamfered front section extending in a rising straight line to the front wall of said frame and forming a tapered slot with the bottom of the casing;
- a front part of said frame, which protrudes from said casing in the open position and has said lower front section edges, has a flat web extending between the upper edges of said side parts;
- a recess is formed at the front end of the top wall of said casing and extends between the side walls, said recess exposing the front portion of said web in the closed position of said frame; and
- a holding device is engaged between said web and said top wall of said casing, which holding device is unlocked by pressing down said exposed front portion of said web and elastically narrowing said tapered slot.

10. The structure defined in claim 9 wherein the holding device comprises a tooth projecting from the web and engaging in a notch in the top wall.

11. The structure defined in one of the claims 1 through 9 including connecting means which are located on the walls of the casing, in particular grooves for building up stacks in which all the containers, and in particular the lowest container, are accessible.

12. A container for a tape cassette having a pair of generally-rectangular, generally-elongated opposite broad sides, narrow side and end edges, and a pair of capstan holes spaced apart along a line parallel to and asymmetric with respect to said side edges, said holes being equi-distant from said end edges, comprising:
- a rectangular casing having a flat top wall, a bottom, two parallel narrow side walls, a rear wall and a front opening:
- a cassette-moving push-in slide in the form of a four-sided open-bottom frame fitting within and movable inwardly and outwardly within said casing through said opening between closed and open positions, the two side parts of said frame extending along said narrow casing side walls, said frame at least partially surrounding the periphery of a tape cassette lying on said casing bottom;
- spring means engaged between said casing and said frame which, after a holding device is unlocked, will propel said frame, together with a tape cassette, which will slide therewith along said casing bottom, a certain distance through said front opening into said open position;
- guide means for controlling the movement of said frame which is designed in such a way that, in said open position, at least that part of said frame which protrudes from said casing assumes an oblique position relative to said casing bottom so that a tape cassette which lies on said casing bottom and protrudes from said casing is at least partially exposed, said frame being provided along its central axis with two cassette-capstan engaging and rotation-preventing lugs spaced apart a distance corresponding to the spacing between the centers of the capstan holes of the tape cassette, which lugs extend perpendicular to said casing bottom in said closed position and are so located and designed that they protrude and fit into that hole zone of the capstan holes which is overlapped by another hole when the position of a cassette in said container is turned about the longitudinal axis of the cassette, whereby said container can receive a tape cassette lengthwise in any one of its four possible positions.

13. A storage container for a tape cassette having a pair of generally-rectangular, generally-elongated opposite broad sides and narrow side and end edges comprising:
- a rectangular casing having top, bottom, side and rear walls and a front opening, said side walls being of greater length than said rear wall;
- four-sided frame-like cassette-moving slide means fitting and movable inwardly and outwardly within said casing through said opening between closed and open positions, said slide means having its bottom open and including side, front and rear frame parts for surrounding the periphery of a tape cassette and for moving the same endwise rectilinearly inwardly and outwardly with said slide means with at least a major portion of one broad side of the cassette resting and sliding on said casing bottom wall, said casing and slide means cooperatively defining, in said slide means closed position, an interior chamber of greater depth than width and having a peripheral shape similar to that of the cassette to closely confine the latter peripherally;
- spring means engaged between said casing and said slide means for urging the latter toward said open position;
- interengageable stop means on said slide means and said casing for limiting outward movement of said slide means to an open position wherein a cassette projecting from said casing and resting on said casing bottom wall will not overbalance, said side frame parts of said slide means being recessed to permit and to limit yieldable inclination of said slide means obliquely from the horizontal in said open position to expose the side edges of the projecting portion of the cassette for manual grasping to remove the cassette from said casing; and
- releasable means for retaining said slide means in said closed position.

14. The structure defined in claim 13 wherein the bottom of the slide means is open, upper portions of the side frame parts are recessed, and the stop means, when engaged, forms a pivot about which said slide means inclines upwardly in the open position under the urging of the spring means.

15. The structure defined in claim 14 wherein the interengageable stop means comprises a tooth depending from the top wall of the casing engageable with the rear frame part of the slide means.

16. The structure defined in claim 13 including boss means on the slide means engageable, in the closed position of said slide means, within at least the forwardly-positioned one of the two winding-hub openings of the cassette to prevent rotation of the corresponding hub, and disengageable from said opening in the open inclined position of said slide means.

17. The structure defined in claim 16 including another boss means on said slide means engageable in and disengageable from the rearwardly-positioned one of the two winding-hub openings of the cassette in the closed and inclined open positions, respectively, of said slide means.

18. The structure defined in claim 14 including a cross bar connecting the upper edges of the side frame parts forwardly of the recesses therein and depending boss means carried by said bar and engageable, in the closed position of the slide means, within the forwardly-positioned one of the two winding-hub openings of the cassette to prevent rotation of the corresponding hub, and disengageable from said opening in the open inclined position of said slide means.

19. The structure defined in claim 18 including bracket means mounted to and extending forwardly from the rear frame part of the slide means, said bracket means being inclined downwardly to permit the said inclination of said slide means, and boss means depending from said bracket means for engagement, in the closed position of said slide means, within the rearwardly positioned one of the winding-hub openings of the cassette to prevent rotation of the corresponding hub, and disengageable from said opening in the open inclined position of said slide means.

20. The structure defined in claim 13 wherein the releasable retaining means includes notch means and tooth means one at the inner side of one of the top and bottom casing walls adjacent the front opening and the other on said slide means front frame part, and including means defining slots in the side frame parts adjacent said front frame part to render the latter springily deformable relative to the remainder of said slide means for releasing said retaining means.

21. A container for a tape cassette having a pair of generally-rectangular, generally-elongated opposite broad sides and narrow side and end edges comprising:
   a rectangular casing having top, bottom, side and rear walls and a front opening;
   four-sided frame-like cassette-moving slide means fitting and movable inwardly and outwardly within said casing through said opening between closed and open positions, said slide means having its bottom open and including side, front and rear frame parts for surrounding the periphery of a tape cassette and for moving the same endwise rectilinearly inwardly and outwardly with said slide means with at least a major portion of one broad side of the cassette resting and sliding on said casing bottom wall, said casing and slide means cooperatively defining, in said slide means closed position, an interior chamber of greater depth than width and having a peripheral shape similar to that of the cassette to closely confine the latter peripherally;
   spring means engaged between said casing and said slide means for urging the latter toward said open position;
   interengageable stop means on said slide means and said casing for limiting outward movement of said slide means to an open position wherein a cassette projecting from said casing and resting on said casing bottom wall will not overbalance, upper portions of said side frame parts of said slide means being recessed to permit and to limit yieldable inclination of said slide means upwardly from the horizontal in said open position to expose the side edges of the projecting portion of the cassette for manual grasping to remove the cassette from said casing; and
   releasable means for retaining said slide means in said closed position.

* * * * *